US010099383B2

(12) United States Patent
Riedel

(10) Patent No.: US 10,099,383 B2
(45) Date of Patent: Oct. 16, 2018

(54) HANDHELD ROBOT OPERATION UNIT AND CORRESPONDING METHOD

(71) Applicant: KUKA Roboter GmbH, Augsburg (DE)

(72) Inventor: Martin Riedel, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 15/097,602

(22) Filed: Apr. 13, 2016

(65) Prior Publication Data

US 2016/0297076 A1 Oct. 13, 2016

(30) Foreign Application Priority Data

Apr. 13, 2015 (DE) .................. 10 2015 206 578

(51) Int. Cl.
*B25J 13/02* (2006.01)
*B25J 9/16* (2006.01)
*B25J 13/06* (2006.01)

(52) U.S. Cl.
CPC ............ *B25J 13/02* (2013.01); *B25J 9/1689* (2013.01); *B25J 13/06* (2013.01)

(58) Field of Classification Search
CPC ........... B25J 13/02; B25J 13/06; B25J 9/1689
See application file for complete search history.

(56) References Cited

U.S. PATENT DOCUMENTS

| 9,586,324 B2 * | 3/2017 | Som ..................... B25J 13/06 |
| 2002/0064023 A1 * | 5/2002 | Akagi .................. G06F 1/1613 361/679.4 |
| 2011/0258887 A1 * | 10/2011 | Chu ....................... E01H 5/106 37/196 |

(Continued)

FOREIGN PATENT DOCUMENTS

| CN | 104373791 A | 2/2015 |
| DE | 10 2010 025 781 A1 | 1/2012 |

(Continued)

OTHER PUBLICATIONS

European Patent Office; Search Report in European Patent Application No. 16163812.7 dated Nov. 9, 2016; 8 pages.

(Continued)

*Primary Examiner* — John C Hong
(74) *Attorney, Agent, or Firm* — Dorton & Willis, LLP

(57) ABSTRACT

A handheld robot operation unit includes a housing having a handle-like grip section, a basic safety control device arranged in the housing, and at least one holder connected to the housing and configured for manually detachably coupling the housing to a device that is different from the handheld robot operation unit and which electronically communicates with the basic safety device. The holder includes a first holding arm for mechanically connecting the handheld robot operation unit to a first edge section of the device, with an opposite edge section of the device being free. A second holding arm is configured to mechanically connect the handheld robot operation unit to a second edge (Continued)

section of the device, adjacent the first edge section and forming a corner section of the device, with an edge section of the device opposite the second edge section being free. A corresponding method is disclosed.

25 Claims, 20 Drawing Sheets

(56) References Cited

U.S. PATENT DOCUMENTS

2013/0161967 A1   6/2013  Jarrett et al.
2015/0051736 A1   2/2015  Mu et al.

FOREIGN PATENT DOCUMENTS

| DE | 102011118310 A1 | 5/2012 |
| WO | 0171878 A1 | 9/2001 |
| WO | 02078913 A1 | 10/2002 |
| WO | 2013029658 A1 | 3/2013 |

OTHER PUBLICATIONS

German Patent Office; Office Action in German Patent Application No. 10 2015 206 578.2 dated Jan. 22, 2016; 7 pages.
Chinese Patent Office; Office Action in Chinese Patent Application No. 2016102284191 dated Dec. 4, 2017; 9 pages.

\* cited by examiner

HANDHELD ROBOT OPERATION UNIT AND CORRESPONDING METHOD

CROSS-REFERENCE TO RELATED APPLICATIONS

This application claims the benefit of priority under 35 U.S.C. § 119(a) to German Patent Application DE 10 2015 206 578.2, filed Apr. 13, 2015 (pending), the disclosure of which is hereby incorporated by reference in its entirety.

TECHNICAL FIELD

The invention relates to a handheld robot operation unit, comprising a housing that has a handle-like grip section, a basic safety control device arranged in the housing, and at least a holder connected to the housing, which is designed for the manually detachable, mechanic coupling of the housing to a device, different from the handheld robot operation unit and electronically communicating with the basic safety control device, and a corresponding method.

BACKGROUND

DE 10 2010 025 781 A1 describes a mobile safety input device with at least one input means for entering a safety signal to a robot control, which comprises an interface for communicating with a mobile device, connected particularly in a detachable fashion to the safety input device, for controlling a robot via communication with said robot control.

The objective of the invention is to provide a handheld robot operation unit and a corresponding method by which a particularly flexible and/or intuitive control, particularly programming of robots is possible.

SUMMARY

The objective of the invention is attained in a handheld robot operation unit, comprising a housing that has a handle-like grip section, a basic safety control device arranged in the housing, and at least one holder connected to the housing, which is designed for the manual, detachable and mechanical coupling of the housing to a device, different from the handheld robot operation unit and electronically communicating with the basic safety control device, with the fastener having a first holding arm, which is designed for a mechanic connection of the handheld robot operation unit to a first edge section of the device, leaving clear the opposite edge sections of the device, and a second holding arm, which is designed for a mechanic connection of the handheld robot operation unit with a second edge section of the device, which abuts the first edge section and this way forms a corner section of the device, leaving clear an edge section of the device opposite the second edge section.

The handheld robot operation unit may particularly be a mobile robot programming device. The handheld robot operation unit may also be a mobile manipulator control device and/or called such a device. The handheld robot operation unit may comprise at least one emergency stop trigger, at least one enabling device, at least one operating type selector, a 3D/6D-mouse, a joystick, and/or a display, particularly an illuminated and/or electronic display.

At least one emergency stop trigger, at least one approval device, and/or at least one operating type selector may be connected with secure technology to a robot control by way of a control system, particularly communicate with it.

The basic safety control device of the handheld robot operation unit is also designed and/or equipped to not only control a robot when the handheld robot operation unit is mechanically connected via the holder to the respective device, but can also be designed and/or equipped for controlling the robot when the handheld robot operation unit is mechanically distanced from the device. Additionally, basic control functions of the robot can also be controlled, mechanically separated from each other, via input means of the handheld robot operation unit. This may represent particularly the already mentioned emergency trigger, the approval device, and/or the operating type selector. Furthermore, other, perhaps not secured input means and/or display means may be provided at the handheld robot operation unit. This may include one or more displays, lighting means, switches, sensors, particularly for the menu control and for triggering touch-ups and/or start/stop keys, for example.

The device, electronically communicating with the basic safety device, may also represent a robot control, the robot arm itself, and/or a robot frame, a mobile robot platform, and/or particularly a mobile terminal.

In case of a mobile terminal, particularly a computer tablet as the device electronically communicating with a handheld robot operation unit, the mobile terminal and/or the tablet may have a program-controlled electronic computer, a touch display, and a program saved in the electronic computer, which is designed to generate robot programs and/or to control a robot, particularly for moving a robot arm and the touch display, and can be operated via the touch display.

The holder according to the invention is designed for the manual connection of the handheld robot operation unit to the respective device electronically communicating. A user, for example a robot programmer, can manually detach the handheld robot operation unit from the device electronically communicating and/or connect it thereto without requiring any tools. The holder is designed here for the manually detachable mechanic coupling of the housing, without requiring any tools, to a device, different from the handheld robot operation unit, and electronically communicating with the basic safety control device.

By the holder comprising a first holding arm, which is designed for the mechanic connection of the handheld robot operation unit to a first edge section of the device, leaving clear the opposite edge section of the device, and a second holding arm, which is designed for the mechanic connection of the handheld robot operation unit to a second edge section of the device, which is adjacent to the first edge section and here forms a corner section of the device, leaving clear an edge section of the device opposite the second edge section, optionally different devices with various sizes can be mechanically connected to the same handheld robot operation unit without any structural changes being required in the device and/or in the handheld robot operation unit. Respective adjustments can be waived, because a mechanic coupling of the handheld robot operation unit to the device always occurs only at a corner section, particularly a right-angle corner section of the device. This way, independent from the respective size of the device, the handheld robot operation unit can be mechanically fastened via the same holder at a corner of the device. Such a mechanic fastening occurs here such that no additional adapters are required and no changes must be made to the device. With the holder according to the invention, devices with right angles, particularly devices that are not square, can also be optionally coupled horizontally or laterally to the handheld robot operation unit in a mechanic fashion. This applies particularly for tablet-like devices, such as mobile terminals and computer tablets. The handheld robot operation unit can also be mechanically coupled to other devices, such as robot arms, mobile robot platforms, or other bases, for example at edges of a table-like coupling site of the respective device abutting in a corner section, i.e. of a robot arm, the mobile robot platforms, or other bases.

Each holding arm can encompass a corresponding edge section of the device in a form-fitting and/or force-fitting fashion. The two holding arms are always designed and/or arranged such that only a single corner of the device is engaged, with the other corners of the device remaining clear and not engaged by a holder, particularly the remaining three corners in case of a rectangular device. In case of rectangular or square devices, the holding arms are designed and/or arranged to mechanically encompass a rectangular corner of the device.

The first holding arm may have a first groove-like seat, which is designed to encompass the first edge section of the device, and the second holding arm may here have a second groove-like seat, designed to encompass the second edge section of the device, with the two groove-like seats being arranged with their longitudinal extension at an angle, particularly a right angle in reference to the first groove-like seat.

Each groove-like seat comprises here a groove bottom, which connects two groove walls, particularly aligned parallel in reference to each other. An upper groove wall of the two groove walls rests on an upper side of the device, when the device is plugged to the handheld robot operation unit. The lower groove wall of the two groove walls contacts the bottom of the device when the device is plugged to the handheld robot operation unit. The two groove walls and perhaps also the groove bottom may have profiled inserts. The profiled inserts may be designed elastically in order to allow independent adjusting to the contour of the device. Alternatively or additionally the profiled inserts may have a profiled design in their cross-section, which is at least approximately or precisely adjusted to the shape of the device. The profiled inserts may be installed fixed to the groove-like seats. Alternatively, the profiled inserts may also be inserted in a fashion detachable from the groove-like seats. By the profiled inserts being deformable or interchangeable, devices of different thickness can optionally be mechanically coupled to the very same handheld robot operation unit.

The housing may have a first housing leg, in which the first holding arm is arranged, and a second housing leg, with the second holding arm arranged thereat, with the first housing leg and the second housing leg stretching a level of the housing which extends parallel to a main level of the device held and extends from the handle-like grip section of the handheld robot operation unit downwards, particularly perpendicular away from said level. However, the handle-like grip section can particularly also be arranged in a different orientation, here at an angle from approx. 20 to 25 degrees in reference to the vertical. This way, ergonomic edge conditions of the human physique can be better considered.

The first housing leg and/or the second housing leg may be designed in one piece with the housing. The first housing leg and the second housing leg may be arranged at a fixed angle, particularly at a fixed right angle in reference to each other. The two housing legs may stretch a level with their longitudinal extensions, aligned parallel to the one of the device, when it is mechanically coupled to the handheld robot operation unit.

The first holding arm and the second holding arm, particularly the first groove-shaped seat and the second groove-shaped seat, may be formed by a bracket, having an L-shaped or U-shaped cross-section, and a compression plate supported in a fashion adjustable in reference to the bracket.

In case of an L-shaped cross-section, one leg of the L-shaped holding arm and/or the L-shaped seat forms the groove bottom and the other leg forms one of the groove walls, either contacting the top or the bottom of the device. The adjustably supported compression plate forms here the other of the two groove walls, either contacting the top or the bottom of the device.

The compression plate may also be supported in an adjustable fashion, out of a default position into a seating position, subject to a spring-loaded return force, in which, when the device is attached to the handheld robot operation unit, the two edge sections of the device, abutting at an angle, are seated by the first holding arm and the second holding arm, particularly the first groove-shaped seat and the second groove-shaped seat, in a form-fitting and/or force-fitting fashion.

By the compression plate being supported in an adjustable fashion, out of a default position into an seat position with a returning spring force, here the width of the groove of the holding arm and/or the groove-like seat can be adjusted. In other words, this way the two opposite groove walls can be opened or expanded such that the respective edge section of the device can be easily inserted, i.e. with little manual force. The compression plate can be connected to a spring device, which automatically pushes the compression plate against the default position. When a device is inserted, here the spring device pushes the compression plate against the device, for example against the bottom of the device, and clamps the device at its edge section to the opposite groove wall, which comes to rest at the top of the device.

The first holding arm and the second holding arm, particularly the first groove-shaped seat and the second groove-shaped seat, may have a stop area, which is designed to contact a front of the device in an seat arrangement of the device at the handheld robot operation unit, and the compression plate is designed for contacting the rear of the device, with the compression plate being supported in an adjustable fashion in reference to the stop area in order to seat differently thick devices.

The compression plate and the stop area limit therefore the groove-like seat into which the device is inserted. By the compression plate being supported in an adjustable fashion in reference to the stop area, the size of the groove-like seat can be adjusted to the thickness of the device respectively to be inserted.

The compression plate may be supported in a linearly adjustable fashion in reference to the stop area. For this purpose, the handheld robot operation unit may have a linear guidance, which allows a linearly adjustable support of the compression plate in reference to the stop area. The linear guidance can here have a spring device, which automatically moves the compression plate into a default position or against the stop area. In the default position of the compression plate the compression plate can abut flush at the contact area, i.e. aligned in the same level.

The adjustable compression plate may be supported in a linearly adjustable fashion together with the handle-like grip section.

The adjustable compression plate may also be supported in a linearly adjustable fashion in reference to the stop area and the handle-like grip section, in particular the handle-like grip section may be fastened rigidly with regards to the stop area.

The compression plate may be supported pivotally in reference to the stop area.

The compression area may form a type of closing cap of a groove-like seat in such an embodiment. In a default position, in which the device is removed, the pivotally supported compression plate may cover and/or seal the groove-like seat. When the device approaches, a lateral edge of the device presses flatly against the compression plate, pivoting it inwardly into the cavity of the groove-like seat. The edge section of the device can then be seated in the groove-like seat. The pivotally supported compression plate may be supported in a pre-stressed fashion by a spring such that the compression plate in a position seated in a groove-like seat of the device presses against the top or optionally against the bottom of the device and this way the device is clamped fixed in the groove-like seat. When it is attempted to pull out the device, the pressure of the pivotally supported compression plate upon the device is additionally enhanced, resulting in a particularly reliable mechanic coupling of the device to the handheld robot operation unit.

The first holding arm and the second holding arm, particularly the first groove-like seat and the second groove-like seat, may have a clamping profile made from an elastic material, particularly a hollow chamber profile comprising an elastic material.

The clamping profile may have at least one, particularly two wedge-shaped inner walls. This way, the device can be inserted and the clamping profile presses against opposite sides, i.e. at the top and the bottom of the device against said device and this way clamps it tightly. The clamping profiles may be produced from an elastomer material.

The clamping profile, particularly the hollow chamber profile, may be expandable via a fluid, particularly compressed air, in order to generate a clamping force. Accordingly, the handheld robot operation unit may have a fluid reservoir and/or a fluid pump. Via the fluid pumps the fluid can be pumped into at least one hollow cavity of the hollow chamber profile so that the hollow chamber profile increases and this way the edge section of the device can be clamped inside the groove-like seat.

In all exemplary embodiments the basic safety control device may have at least one emergency stop trigger, at least one enabling device, at least one operating type selector, and/or at least one display means, particularly at least one electronic display.

In general, the handheld robot operation unit may have a holder, particularly a holder as described above, which is designed for fastening the handheld robot operation unit to a device, particularly a robot arm, a control base, a mobile robot platform, and/or a mobile terminal, particularly a computer tablet.

The described holder according to the invention may be designed, in addition to the option for coupling a mobile terminal, particularly a computer tablet, to allow mechanically coupling the handheld robot operation unit to a corresponding edge of a robot arm, a control base, and/or a mobile robot platform. For this purpose, the robot arm, the control base, and/or the mobile robot platform may have a brace, which comprises an edge section at which the holder, particularly the groove-shaped seat of the handheld robot operation unit, can be mechanically coupled.

However, the handheld robot operation unit may also have a holder separated from the one described according to the invention, i.e. an additional one, which is designed to allow mechanically connecting the handheld robot operation unit to the robot arm, the control base, and/or the mobile robot platform. Alternatively, the robot arm, the control base, and/or the mobile robot platform may have a seating niche, in which the handheld robot operation unit and/or its housing can be inserted at least partially or even totally.

In all embodiments the handheld robot operation unit may have a manual actuating means, particularly an actuating means arranged at the handle-like grip section, which is designed to keep the holder in a clamped position in the locked stage of the actuating means, and to release the holder from the clamped position in an unlocked stage of the actuating means.

The actuating means may be integrated in the handle-like grip section. For example, the actuating means may be designed to be operated only with one finger of one hand, when a user of the handheld robot operation unit holds the handle-like grip section in his/her hand. For example, the holder can be released with one hand and the device can be removed from the handheld robot operation unit with the other hand. When the device is mechanically coupled to the handheld robot operation unit the actuating means can lock automatically and fix the holder in the clamping position.

The handheld robot operation unit according to the invention may offer one or more of the following advantages, depending on the embodiment.

With the holder according to the invention a handheld robot operation unit can be provided, which allows universal coupling and fastening options with almost any computer tablet, i.e. independent from size and manufacturer. With the holder according to the invention the handheld robot operation unit can be used both by right-handed persons as well as left-handed ones. Additionally, the devices, particularly computer tablets, can optionally be used in a lateral alignment or a longitudinal alignment, without here requiring any changes or adjustments of elements at the computer tablet or the handheld robot operation unit.

The invention also allows the use of the handheld robot operation unit according to the invention in mobile robotics, so that here too always a secure state of the system is ensured.

The invention also allows the use of the handheld robot operation unit according to the invention in stationary robotics, so that here too always a secure state of the system is ensured.

Alternatively, for manually moving a robot, either in a mobile or a stationary fashion, for example via a 6D-mouse or the control keys at the mobile control device and/or via hardware or software keys, the robotic system can also be controlled by gestures, such as manual guiding. Here, the mobile control device may also be fastened via a standard adapter directly at the robot and/or the mobile platform. The user can guide the system via the 6D-mouse into the desired position, without requiring any force. Alternatively, the 6D-mouse may also be coupled via a mechanic adapter interface on the top directly to the system to be moved.

When the directions of motion are inverted automatically in the control, the user can very easily and intuitively guide any arbitrary robot system manually, by moving and/or rotating, particularly with one hand, the grip into the desired direction and here simultaneously activating the enabling key. By pressing the teach-keys the points are then saved in the program.

The operation of a redundant robot system can also occur intuitively and directly via hardware keys, such as 6D-mouse or individual keys, by the degrees of freedom being addressed in groups in a suitable fashion and zero-space motions being used efficiently.

The present invention shall realize a mechanic coupling concept. Here, focus is given to a simple, quick, and stable coupling and decoupling principle, which allows the integration of arbitrary devices, such as particularly computer tablets with different dimensions and key and/or connection arrangements. Here, intentionally special solutions are waived, which require adjustments, changes, or special features at the device.

It shall be possible to easily connect all models of different manufacturers, from small smart phones to large industrial computer tablets, mechanically to the handheld robot operation unit so that the user can hold and operate all safety switches, as well as robot-specific keys comfortably in one hand, together with the computer tablet. A quick exchange from the vertical format to the lateral one or vice versa is also possible by a simple device reorientation at the handheld robot operation unit, such as the change from the holding hand operated by a right-handed person to a left-handed person.

The effective areas of the clamping are limited to the corner section and the two corresponding legs of the device, particularly a tablet computer. This allows, on the one hand, a stable conduction of force and moment support on minimum structural space and on the other hand an only minimal covering of the top of the device and/or the display. The primary clamping sites at the device, particularly at the computer tablet, shall be limited at least largely to the bottom as well as the edge section next to the display.

The holder according to the invention provides optimal stability of the clamping connection with simultaneously the advantages described above. For example, a secure and simultaneously easily applied clamping function is given, which prevents any accidental release of the device even when shaken. Although in the following the invention is explained in greater detail based on a computer tablet, these aspects can generally also apply according to the invention to other types of devices.

For this purpose, in the position of the tablet in the lateral direction it may contact in a defined fashion at two lateral stops in a corner arrangement, while two L-shaped braces, articulate in reference to each other, clamp the tablet with friction elements at the edge of the top and bottom securely in the area of a corner. The normal force for friction is generated in an exemplary variant with a central plate via a helical spring with an inclined parameter, which ensures that small, flat tablets or smart phones can easily be clamped, and heavier, thick tablets are clamped with a stronger force. The braces or clamping braces may be designed at the holding arms and/or at the grooves of the holding arms and/or directly be formed thereby.

A relative motion of the two braces comprises here the spectrum at different tablet heights, which shall be clamped, which generally ranges from 0 mm to 20 mm. A parallel guidance of the braces may be realized via a simple rail-sled solution.

When the handle for holding the mobile control device incl. the tablet is connected fixed during use with the clamping braces located at the bottom, the actuating forces upon the tablet are usually directed straight to the handle. This releases the clamping connection and avoids that the tablet is accidentally pushed out of the fastening.

In order to insert and remove the tablet the spring-loaded clamping braces are pushed apart by a manual actuating force at an additional trigger key such that an easy tablet handling is possible. Here, the trigger key is designed in such a form that it simultaneously serves as a type of holding grip for the mobile control device. This may be necessary, because the user must hold the mobile control device with one hand, while he/she inserts and/or removes the tablet with the other one. Due to the fact that this process requires the actuation of the trigger key, it may be located in direct proximity of the holding grip or form a unit with said holding grip. After insertion, the user changes his/her grip from the holding grip to the handle of the mobile control device, which is provided to carry and control the device. The holding grip and the handle are generally two differently formed elements at the mobile control device, which may also be combined in special cases of the embodiment.

Optional top and bottom friction areas of the L-shaped braces may be arranged such that they contact oppositely, i.e. at a zero distance, or that they pass each other slightly offset from one another. Here, the tablet is clamped either by compression or by shearing. When the two friction areas, as in the first case in the zero position when no tablet is inserted, are pressed against each other, they are only open briefly during the coupling process. This way, a loss of friction, caused by soiling or contamination of the contact areas, can be considerably reduced.

The bottom L-shaped brace, connected to the handle, can be expanded in the central part in a planar fashion such that here structural space develops for a flat simple display, which is covered by an inserted tablet and thus is functionally replaced. This central plate is advantageous, in combination with the above-explained clamping principle, in that visual gaps are avoided and a uniformly closed appearance develops, both with as well as without any tablet inserted. Simply stated and in other words, the clamping gap is always just as wide as absolutely necessary. Without any tablet, the gap is therefore completely closed and the central plate with the display and the bottom clamping braces visually transfers evenly or at best with a minimum step into the upper clamping braces, on which the control and safety keys shall rest. This underscores the valuable character of the mobile control device, representing a complete and independent compact unit.

The handheld robot operation unit may form a portable and/or compact unit which can easily be coupled, disconnected, and transported, particularly carried by hand. By the handheld robot operation unit the capacity, display quality, and/or the user friendliness of newest devices, such as mobile terminals, as for example computer tablets for controlling a robot can be used.

Integration and coupling options for several tablet models and series of different manufacturers can be provided here. Even newly obtained models can easily be integrated and used without little expense. User requirements and user demands regarding hardware and software can be considered by an individual selection of the mobile terminal. The user of the robot profits from the constant further development of mobile terminals, particularly computer tablet and their capacities. A new device can easily be integrated, which is possible with little expense and low costs. Different users can easily connect their various mobile terminals, particularly computer tablets, optionally to the same robot using mechanic and control engineering. A user may select from the wide spectrum of mobile terminals, such as computer tablets, depending on performance and price category most appropriate for him/her. Here, a mixture may also be possible. For example, simple mobile terminals and/or computer tablets for maintenance and service technicians may be provided and very powerful mobile terminals and/or computer tablets may be provided, for example for developers or testers of applications.

The handheld robot operation unit may therefore form a basic control device for the robot. It may offer a basic functionality at the robot, primarily with regards to a safety functionality. The handheld robot operation unit alone can be designed cost-effectively and in a standardized fashion. It may remain at the robot and/or in the proximity of said robot or distanced therefrom. One handheld robot operation unit may be provided per robot. It may be implemented to provide only simple mechanic and electric coupling options, with the basic safety control device not necessarily requiring any changes or upgrades, but it may be sufficient to exchange or replace for example the mobile terminal when progressive retrofitting shall be provided. The handheld robot operation unit may be designed in an appealing fashion and like a complete unit, even without any device and/or mobile terminal at least operational in its basic functions.

By the holder according to the invention the handheld robot operation unit can optionally be used autonomously, i.e. separated from other devices electronically communicating with the mobile robot control, or it may be connected to the respective device in a particularly temporary mechanic connection. For example, the handheld robot operation unit may be mechanically coupled, particularly in a temporary fashion, to most different devices. Additionally, by the holder according to the invention the handheld robot operation unit can be mechanically coupled at various points of the same device and/or in most different alignments of the handheld robot operation unit at the same device. For example, different ergonomic embodiments of the handheld robot operation unit and the device may be created. For example, the same device, such as a mobile terminal like a computer tablet, can be altered by different plug-in sites of the handheld robot operation unit from a right-handed operation into a left-handed operation and/or into a longitudinal format or a lateral format.

In general, by the holder according to the invention at least one mechanic connection is provided between the handheld robot operation unit and the electronically communicating device. The mobile robot control unit itself is connected by control technology in general to a robot control such that by operating the basic safety control device of the handheld robot operation unit the robot control is addressed in order to move for example the robot arm or control the mobile robot platform. A connection between the robot control, the handheld robot operation unit, and the electronically communicating device, particularly a mobile terminal, such as a computer tablet using control engineering, may be an electric connection. Here, the handheld robot operation unit may communicate securely either wirelessly or wired to the robot control. Additionally, the electronically communicating device, particularly the mobile terminal such as a computer tablet, can be directly connected to the robot control or electrically coupled to the handheld robot operation unit and this way use the already existing communication of the handheld robot operation unit to the robot control. The commands or signals transmitted via the electronically communicating device, particularly via the mobile terminal such as the computer tablet, to the computer control, can be transmitted using safe technology or non-secured technology. The handheld robot operation unit with its safety-relevant operator functionality, such as emergency shut-off or enabling key, must however be connected securely to the robot control. A wireless interface of the electronically communicating device, particularly the mobile terminal, such as the computer tablet, can also be used at a work site distanced from the robot for a wireless communication, for example using an external keyboard, mouse, and/or an external monitor.

The invention can therefore connect, depending on the embodiment of the two worlds, a secure and reliable industrial control and progressive, user-friendly and powerful consumer electronics to each other and this way open new paths in an efficient and simple robot operation and robot control.

This invention describes the basic concept as well as exemplary embodiments of a temporary, mechanic coupling of a device, separate from the handheld robot operation unit communicating electronically, particularly a mobile terminal with safety-relevant robot and/or equipment-specific basic operating elements, which are provided on the handheld robot operation unit, i.e. the basic safety control device of the handheld robot operation unit.

By the technical solution of a mechanical and technical coupling of controls, by connecting the handheld robot operation unit to a separate electronically communicating device, such as for example a mobile terminal, like a computer tablet, to a robot control in order to control said robot, accordingly different device systems can be generated, which can be combined for many operating scenarios, such as shown among other things in exemplary embodiments of the figures.

The basic safety control device may have in all variants of the embodiment at least one emergency stop trigger, at least one enabling device, at least one operating type selector, and/or at least one display, particularly at least one electronic display.

The handle-like grip section of the handheld robot operation unit may be designed like a handle of a ski pole or a pistol grip, for example. The handle-like grip section of the handheld robot operation unit may therefore have a circumference, which is maximally so large that its housing section may be encompassed at its jacket wall at least approximately completely by the hand of the user. Additionally, recess-like indentations may be provided at the jacket wall, which are designed for inserting one finger each of the hand of the user at respectively one recess-like indentation at the jacket wall. The recess-like indentation may therefore be adjusted in size, shape, and alignment with regards to ergonomic aspects to a hand of a human being. An upper section of the jacket wall may project, in a manually grasped condition of the handheld robot operation unit, beyond the first of the holding user towards the top and comprise the holder according to the invention. A sub-section of the jacket wall may project in a manually grasped condition of the handheld robot operation unit beyond the first of the holding user towards the bottom.

The total period in which the user operates the active robot, programs it, manually displaces it, analyzes or changes settings or parameters, is usually very short compared to the overall operating period. In this short period of time, a user device is desired as high-quality, capable, and user-friendly as possible, in order to allow an efficient, quick, and flawless operation with minimal downtime of the robot. In the remaining time, i.e. during the normal operation of the robot in automatic operation, only a few basic functions are required for operation, primarily safety functions and status displays; thus high functionality of the control device is not required permanently or only in a very targeted fashion and only briefly.

An approach to temporarily increase the functionality to a considerable degree is the separation of high-quality operating functions and simple basic functions in two spatially separated units. The two units may meet, in addition to different operating functionality, also different safety requirements.

A temporary coupling of these units allows avoiding a dual assignment of functions, such as for example safety hardware keys, and thus reduces costs and structural space.

The goal is to provide an operating concept, both with respect to technical operation as well as economic feasibility, in which a cost-effective basic operating device is used with basic functionality and a powerful computer tablet from the consumer field.

The invention presented here relates to such a basic control device, i.e. a handheld robot operation unit, designed as a multi-functional control grip that has various coupling options to stationary or mobile machines, as well as robots or different control devices. It serves as a universal base device and has, depending on its coupling partner, i.e. an electronically communicating device, different functionalities and differential scopes of functions. The invention offers essential advantages over the known concepts and control and input devices presently available in the market, for example that a single universal basic device can be used for most different fields of application in robotics, which can be coupled to different partners allowing the functionality to be adjustable depending on the coupling partner. Used as coupling partners may be, for example, active systems, such as robots and mobile platforms, and/or passive systems such as the environment and cell frames, as well as additional input devices, such as computer tablets, smart phones, and/or measuring and analysis systems, such as camera/tracking systems or force measuring sensors. The particular embodiment of the basic device with a handle-like grip section offers an ergonomic and intuitive operation with simultaneously compact and user-friendly dimensions. The ergonomic form of the handle as well as the hardware keys for safety functionality and basic operation are also required in the coupled state in order to hold the coupled partner, for example a computer tablet, or for example to guide a robot and here always allowing to access functions, such as enabling and emergency-off. The most important status reports and system conditions can also be displayed without any computer tablet coupled, directly at the control handle.

The coupling concept allows a free expansion and adjustment of coupling partners and potential coupling sites, which are essentially separate from the geometric embodiment of the coupled partners. Accordingly, arbitrary models of computer tablets of different sizes, key positions, and connections can be connected in a simple fashion, using the handheld robot operation unit according to the invention.

In order to allow fulfilling different requirements set for a robot control device over its life cycle, either a very high-quality operation device can be used for each robot unit or, in the sense of the invention, a minimalistic basic operating handle can provide the required basic safety functions.

This simple and cost-effective basic operating handle, i.e. a handheld robot operation unit according to the invention, can temporarily be coupled to another, this time very high-quality separate device, such as a standard computer tablet, in order to allow briefly a powerful operation. Here, any robotic unit, such as a robot or mobile platform, may have perhaps at least one such basic operating handle for every cell. The high-quality separate devices are here not allocated to fixed units of handheld robot operation units, and can therefore always be used as necessary at the location they are needed. The number of these computer tablets, for example, depends on the type and size of the overall arrangement and can be easily increased by the user independently and on short notice.

The invention therefore provides a control concept, which uses resources efficiently at the location required, and in spite thereof allows at all times secure control of the basic functions on site of the unit. This allows to offer to the user a very powerful robot control, which always meets the standards of present state of the art, offers the user very economic robot control, which always optimally utilizes the resources available, and among other things creates standard input units, offers to the user a very secure robot operation fulfilling all necessary guidelines and standards, and offers to the user a very intuitive, efficient, and individual robot operation, which can be configured via the graphic user surface of the tablet completely freely and specific for the application and the user.

The handheld robot operation units can therefore be designed such that optionally one of several possible, different mobile terminals, particularly mobile terminals of different model types and/or sizes can be connected to the same basic safety control device, and the selected mobile terminal can be mechanically connected in an inserted or attached condition to the basic safety control device.

The goal of the invention can therefore be to provide an industrial handheld robot operation unit, which with regards to control standards and safety regulations as well as environmental influences and/or ergonomic features can be held at an advanced level of quality during operation. With the holder according to the invention it is possible to connect for example present commercially available mobile terminals to an existing basic safety control device, and this way very powerful mobile terminals presently available in the market can be used for controlling industrial handheld robot operation units.

Using the holder according to the invention, differently designed mobile terminals can be connected mechanically to the particularly uniform basic safety control device in a particularly simple and flexible fashion. Using the holder according to the invention, for example the mobile terminal can even be optionally separated or connected manually by a user from the basic safety control device. For example, here two or more devices, i.e. the uniform basic safety control device and the selected mobile terminal can be combined to each other, or each individual device may be used separately. The handheld robot operation unit, particularly the basic safety control device is here operational in an autonomous fashion in a safe operation to such an extent and for example the removed device is also independently operational, although not with secured technology. Consequently, here several adequate operating devices can be generated for different scenarios.

Deviating from solutions of prior art, the user is additionally provided with the option by the handheld robot operation unit according to the invention to manually control or stop a robot at any time using a handheld robot operation unit connected to the robot, particularly directly or in a mechanic fashion, with regards to common or minimum basic functions. This simple handheld robot operation unit can be expanded by mechanical and technology engineering coupling to a robot, a mobile robot platform, and/or a mobile terminal, such as a computer tablet or a smart phone to form a high-quality and multifunctional mobile control device, which is suitable even for very complex and complicated programming, analysis, and service tasks. In the separate operation of a mobile terminal, such as a computer tablet, also detached from the handheld robot operation unit, this mobile terminal is portable and can be used locally independent, e.g., at the work site, in the office, or in a conference room individually or for example in combination with external monitors or external input devices in order to prepare offline certain processing steps or programs for the robot, evaluate data gathered, and/or inquire about status reports and/or conditions of one or more robots via distant monitoring. Furthermore, in this case the mobile terminal can be used as a user-based, personal input device of the handheld robot operation unit. This is advantageous in that for example several persons may work in different functions for the same robot, with perhaps optimal configurations, e.g. regarding software equipment, user data, such as cookies, accounts, and/or access rights, being individually generated on the mobile terminal and/or can be recalled at a later day.

The objective according to the invention is additionally attained in a method for operating a handheld robot operation unit, particularly according to one or more embodiments as described, having a basic safety control device comprising a holder, designed for the manual connection of a device communicating electronically with the basic safety control device to the basic safety control device, comprising the step:

clamping the device to the holder of the handheld robot operation unit only at a single corner section of the device.

A further development of the method according to the invention comprises the step:

automatically and/or manually releasing the clamped device such that a robot arm or a mobile robot platform can be addressed by operating input means of the device when the basic safety control device is connected to the device and/or an electronic communication is established between the basic safety control device and the device, and the device is clamped fixed in an orderly fashion, particularly securely, to the handheld robot operation unit.

Another further development of the method according to the invention includes the step:

manually operating the basic safety control device for controlling a robot arm or a mobile robot platform when the basic safety control device is separated from the device and/or an electronic communication between the basic safety control device and the device is interrupted, particularly no sufficient clamping is given between the handheld robot operation unit and the device.

Several exemplary embodiments of the invention are explained in greater detail in the following description with reference to the figures. Specific features of these exemplary embodiments may include general features of the invention, regardless of context in which they are mentioned, that may be comprised individually or in other combinations.

DETAILED DESCRIPTION

Figure 1:
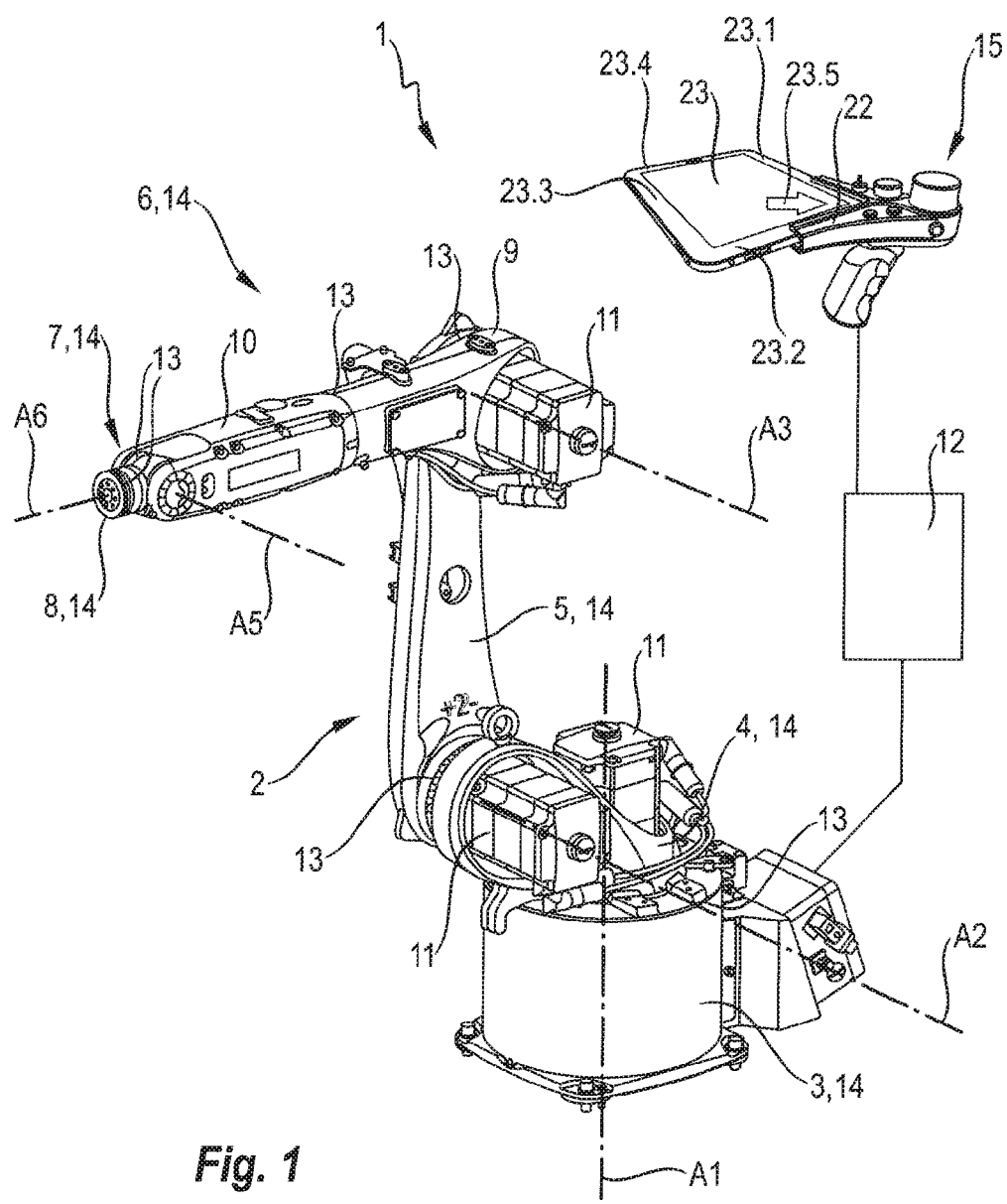
FIG. 1 a schematic illustration of a robot, comprising a robot arm and a robot control, as well as a handheld robot operation unit according to the invention, FIG. 2 a perspective illustration of a special embodiment of the handheld robot operation unit standing alone, FIG. 3 a perspective illustration of the handheld robot operation unit according to FIG. 2 from the rear, FIG. 4 a side view of a handheld robot operation unit according to FIG. 2, FIG. 5 a perspective illustration of a handheld robot operation unit according to FIG. 2 from the bottom, FIG. 6 an illustration of a system of a manual robot control device and a device attached to the manual robot control device in the form of a mobile terminal like a computer tablet, FIGS. 7-10 various schematic perspective illustrations of compression plates and their potential adjustments to the handheld robot operation unit, FIGS. 11-12 various schematic perspective illustrations of clamping profiles of the manual robot control device, FIG. 13 a schematic perspective illustration of a combination of clamping profiles with an adjustably supported compression plate, FIG. 14 a schematic perspective illustration with pivotally supported compression plates, FIG. 15 a schematic perspective illustration with a hollow chamber-clamping profile, which can be expanded via a fluid, FIGS. 16-18 various schematic, exemplary variants of holding arrangements between the handheld robot operation unit and different devices, and FIGS. 19-20 two exemplary variants of manual actuating means, which are arranged in the handle-like grip section of the manual robot control device.

FIG. 1 illustrates a robot 1, comprising a robot arm 2 and a robot control 12. The robot arm 2 comprises, in case of the present exemplary embodiment, several links 14 arranged behind one another and connected via joints 13. The links 14 particularly represent a frame 3 and a carousel 4, supported rotational in reference to the frame 3 about an axis A1 which extends vertically. In case of the present exemplary embodiment, further links of the robot arm 2 are a link arm 5, a cantilever 6, and a robot hand 7 comprising preferably several axes with a fastening device, designed as a flange 8, for fastening an end effector not shown in greater detail. The link arm 5 is supported in a pivotal fashion at the bottom end, e.g., at a link bearing head not shown in greater detail on the rotating carousel 4 about a preferably horizontal axis of rotation A2. At the upper end of the link arm 5 in turn the cantilever 6 is supported in a pivotal fashion about an also preferably horizontal axis A3. It carries at the end the robot arm 7 with its preferably three axes of rotation A4, A5, A6.

The cantilever 6 shows, in case of the present exemplary embodiment, an arm housing 9 supported pivotally at the arm link 5. A basic hand housing 10 of the cantilever 6 is supported at the arm housing 9, pivotal about the axis of rotation A4.

The robot arm 2 is mobile via three electric drive motors 11 in its three basic axes and via three additional electric drive motors 11 in its three axes of the hand.

The robot control 12 of the robot 1 is designed and/or implemented to execute a robot program, by which the joints 14 of the robot arm 2 can automatically be adjusted and/or rotationally moved automatically according to the robot program or in a manual drive operation. For this purpose, the robot control 12 is connected to the electric drive motors 11 that can be addressed, which are designed to adjust the joints 14 of the robot arm 2. With the robot control 12, a handheld robot operation unit 15 is connected by control engineering.

Figure 2:
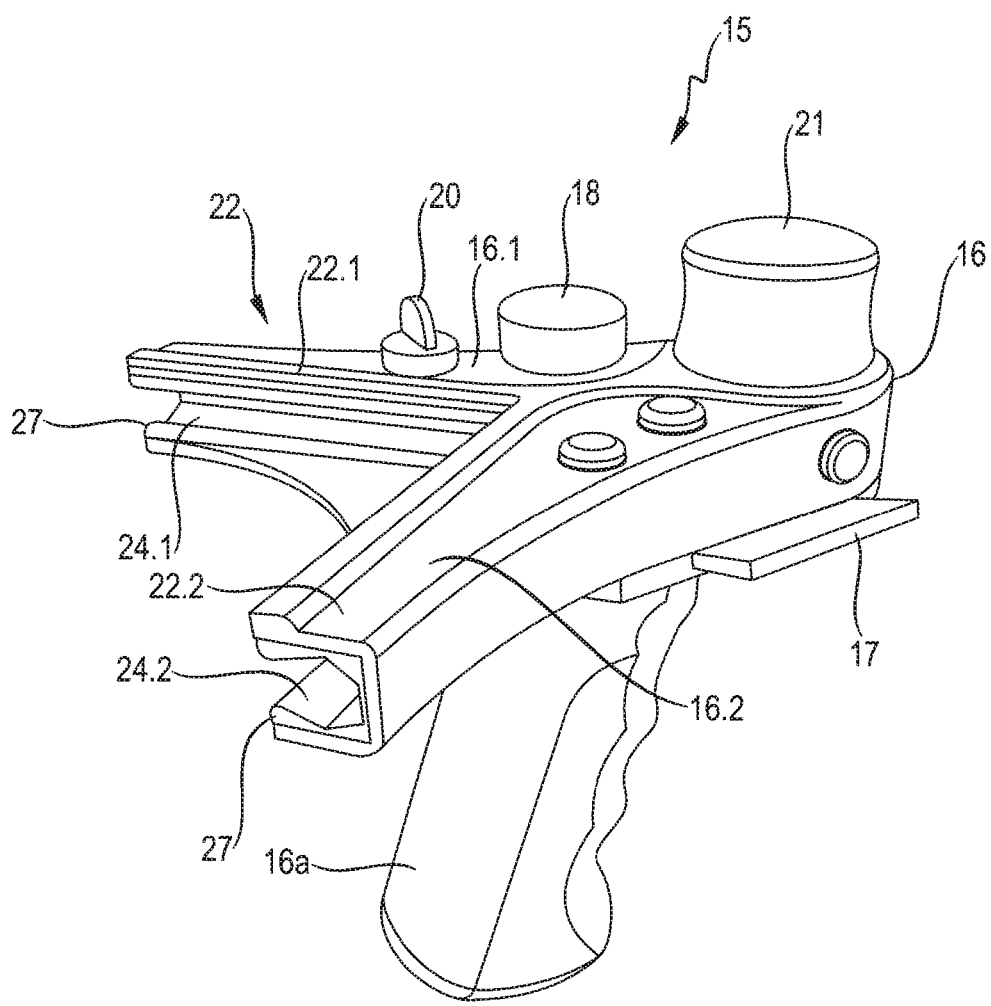

FIG. 2 shows the handheld robot operation unit 15. The handheld robot operation unit 15 has a housing 16 and a basic safety control device 17 arranged inside the housing 16. The housing 16 comprises a handle-like grip section 16a.

The basic safety control device 17 may comprise an electronic circuit board, which is electrically connected to input and/or output means.

Figure 3:
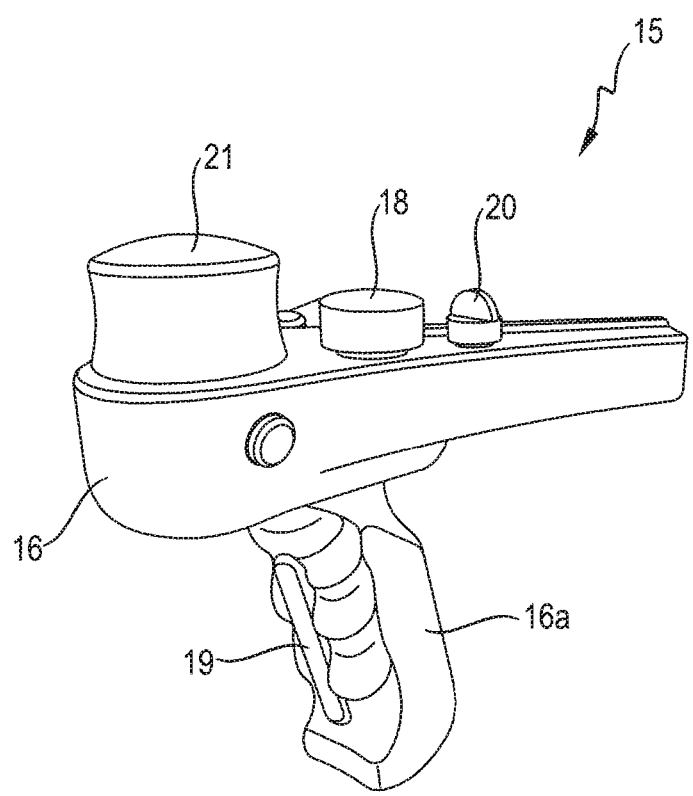
Figure 4:
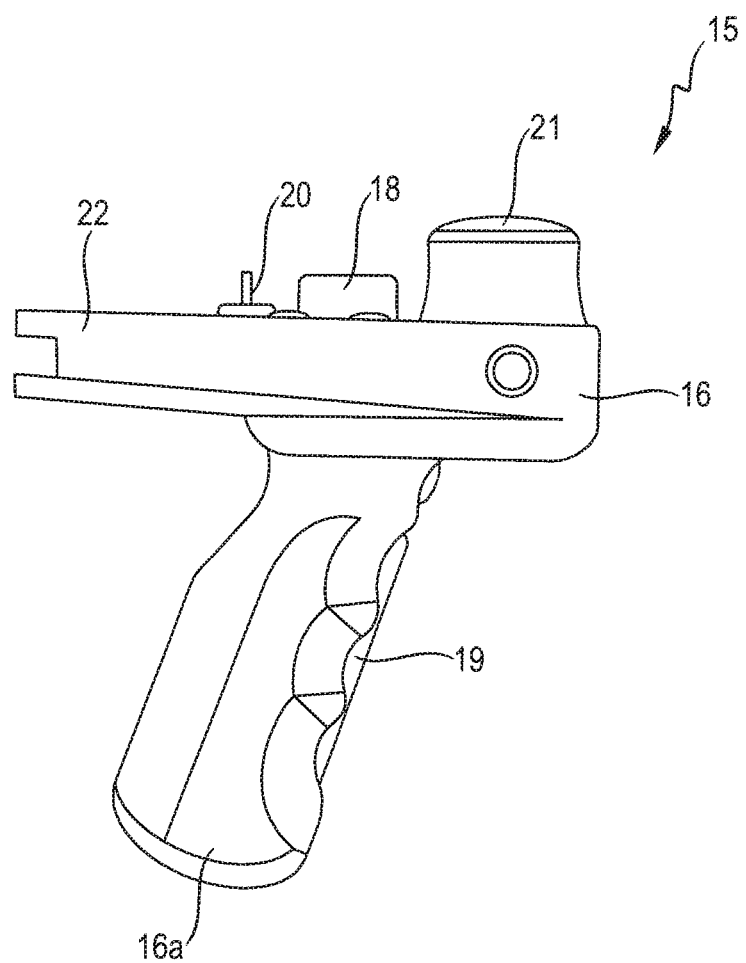

The basic safety control device 17 may have as an input and/or output means at least one emergency stop-trigger 18, at least one enabling device 19 (FIG. 3), at least one operating type selector 20, at least one 3D/6D-mouse 21, and/or a joystick and/or at least one display, particularly an electronic display.

The handheld robot operation unit 15 has a holder 22, which is designed for the manual and detachable mechanic coupling of the housing 16 to a device 23, which is different from the handheld robot operation unit 15 and electronically communicates with the basic safety control device 17. The holder 22 comprises a first holding arm 22.1, which is designed for the mechanic connection of the handheld robot operation unit 15 to a first edge section 23.1 of the device, keeping clear an opposite edge section 23.3 of the device 23. The holder 22 additionally comprises a second holding arm 22.2, which is designed for the mechanic connection of the handheld robot operation unit 15 to a second edge section 23.2 of the device 23, which is adjacent to the first edge section 23.1 and here forms a corner section 24 of the device 23, keeping clear an edge section 23.4 of the device 23 opposite the second edge section 23.2.

As shown particularly in FIG. 2, the first holding arm 22.1 has a first groove-like seat 24.1, which is designed to encompass the first edge section 23.1 of the device 23. The second holding arm 22.2 also has a second groove-like seat 24.2, which is designed for encompassing the second edge section 23.2 of the device 23. The second groove-like seat 24.2 is here arranged with its longitudinal extension at a right angle in reference to the first groove-like seat 24.1.

Figure 5:
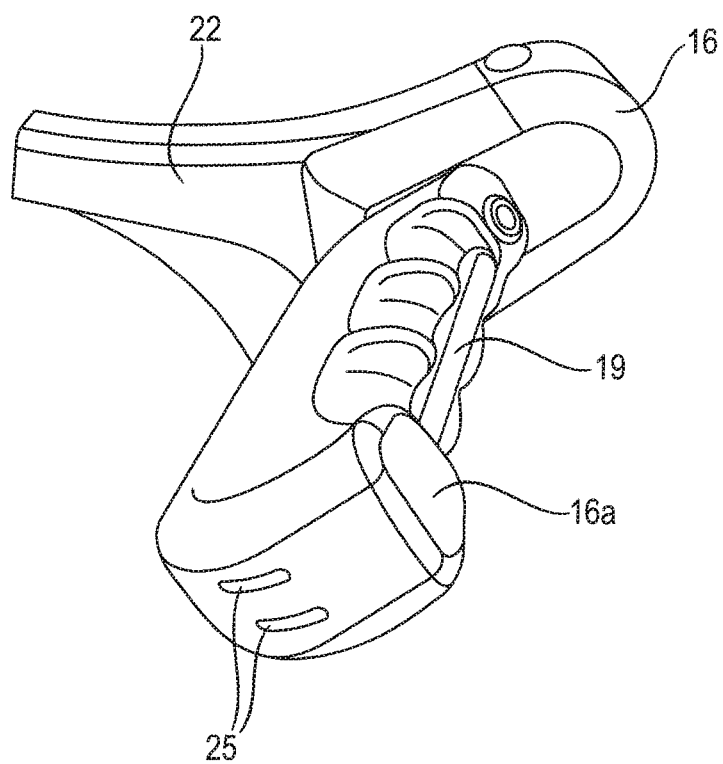
Figure 6:
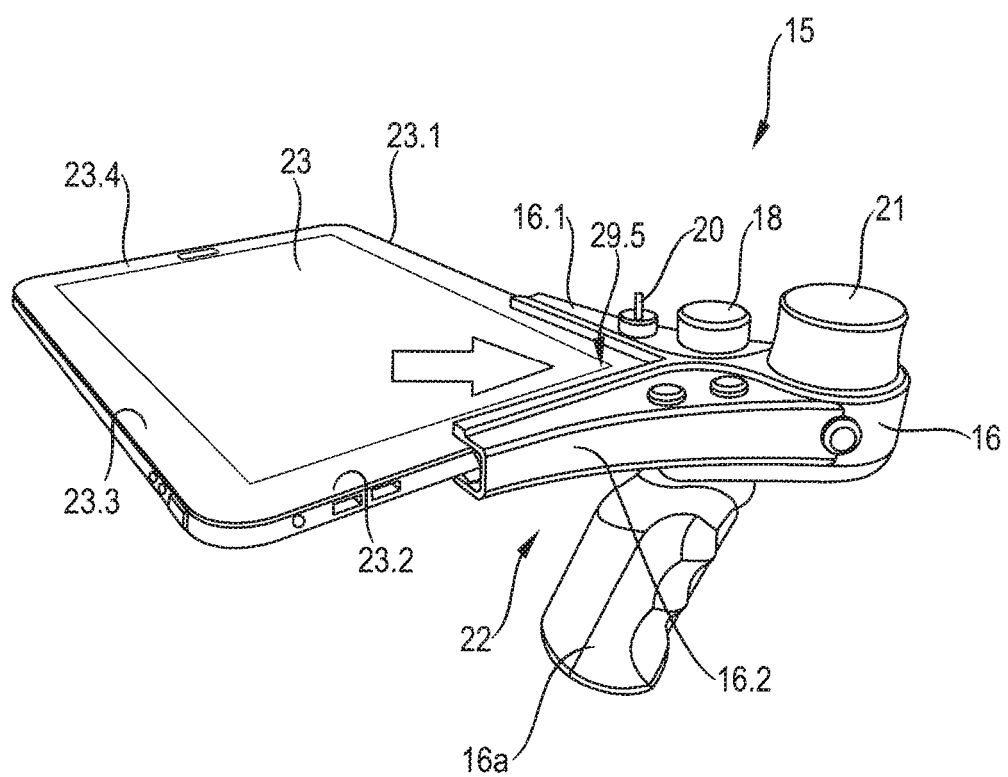

The embodiment shown in FIGS. 2 to 6 has the housing 16 of the handheld robot operation unit 15 of a first housing leg 16.1, which is arranged at the first holding arm 22.1. In this embodiment the housing 16 of the manual robot control device 15 additionally comprises a second housing leg 16.2, at which the second holding arm 22.2 is arranged. The first housing leg 16.1 and the second housing leg 16.2 here stretch a level of the housing 16, which extends parallel to a main level of the device 23 held (FIG. 1 and FIG. 6) and from which the handle-like grip section 16a of the handheld robot operation unit 15 extends away towards the bottom, particularly perpendicular to the level. As shown in FIG. 5, at a bottom of the handle-like grip section 16a, the handheld robot operation unit 15 may have electric connections 25. The electric connections 25 may for example be charging contacts, by which an internal battery and/or an internal accumulator of the handheld robot operation unit 15 can be charged by an external electric energy source. The electric connections 25 may however also represent contacts of a signal line, which allows a wired electronic communication of the handheld robot operation unit 15 to an external device.

In the embodiment shown in FIGS. 2 to 6 the first holding arm 22.1 and the second holding arm 22.2, particularly the first groove-like seat 24.1 and the second groove-like seat 24.2 are formed by holding means with a U-shaped cross-section. In this case, a clamping profile 27 is respectively inserted into the U-shaped holding bracket.

Figure 7:
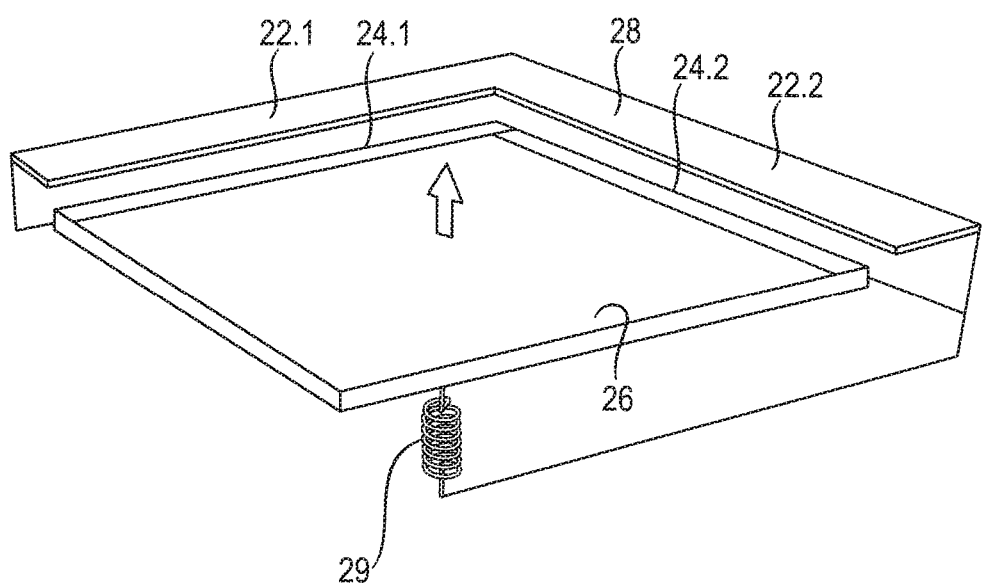

FIG. 7 shows schematically another embodiment of a holder 22. The first holding arm 22.1 and the second holding arm 22.2, particularly the first groove-like seat 24.1 and the second groove-like seat 24.2 are formed in this embodiment by a holding bracket 28, with an L-shaped cross-section, and a compression plate 26 supported in an adjustable fashion in reference to a holding bracket 28.

Figure 8A:
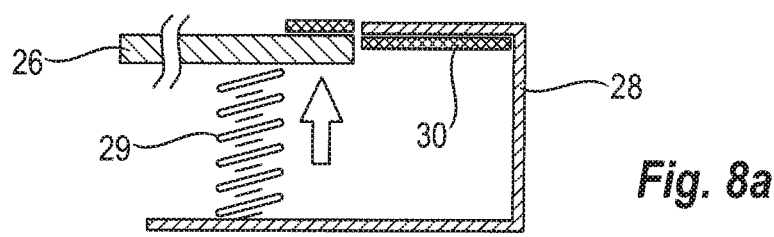
Figure 8B:
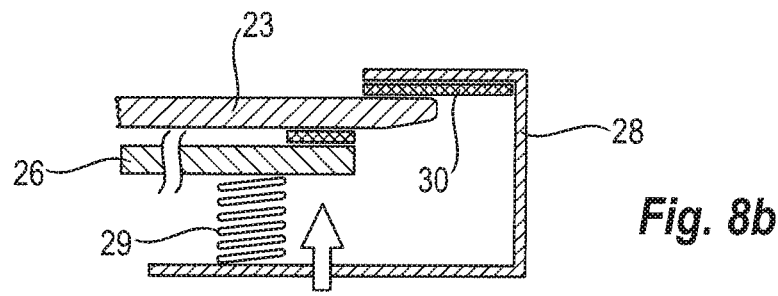
Figure 8C:
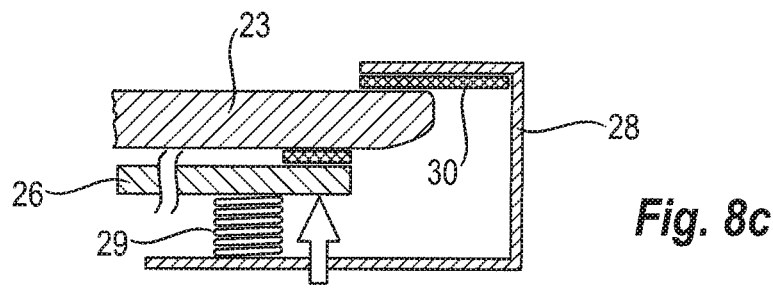

The compression plate 26 is supported in a fashion adjustable from a default position (FIG. 8a) by the force of a return spring (spring 29) into an seat position (FIG. 8b, FIG. 8c), in which the two angular abutting edge sections of the device 23 are seated, when the device 23 is connected to the handheld robot operation unit 15 (FIG. 8b, FIG. 8c) by the first holding arm 22.1 and the second holding arm 22.2, particularly the first groove-like seat 24.1 and the second groove-like seat 24.1 in a formfitting and/or force fitting fashion.

The first holding arm 22.1 and the second holding arm 22.2, particularly the first groove-like seat 24.1 and the second groove-like seat 24.2 have a stop area 30, which is designed for contacting a front of the device 23 in an seat arrangement (FIG. 8b, FIG. 8c) of the device 23 at the handheld robot operation unit 15, and the compression plate 26 is designed for contacting at a rear of the device 23, with the compression plate 26 being supported, in order to seat differently thick devices (FIG. 8b, FIG. 8c) adjustable in reference to the stop area 30. The compression plate 30 is supported in the exemplary embodiment of FIG. 7 and FIG. 8a to FIG. 8c linearly adjustable in reference to the stop area 30.

Figure 9:
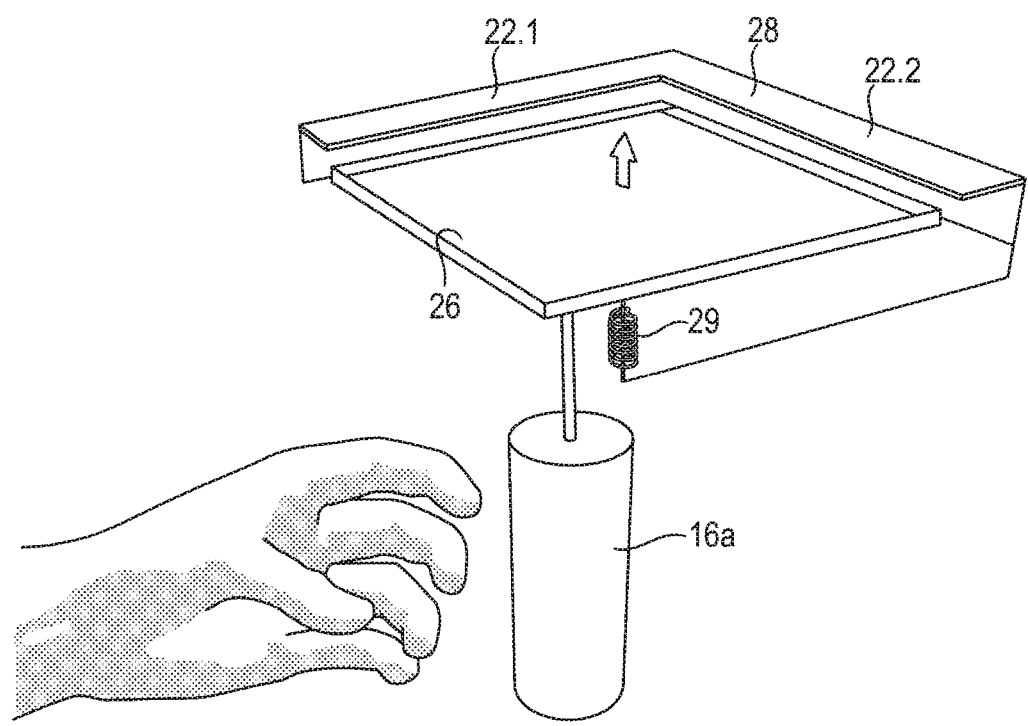

In a variant here the adjustable compression plate 26 is supported in a linearly adjustable fashion together with the handle-like grip section 16a, as shown schematically in FIG. 9.

Figure 10:
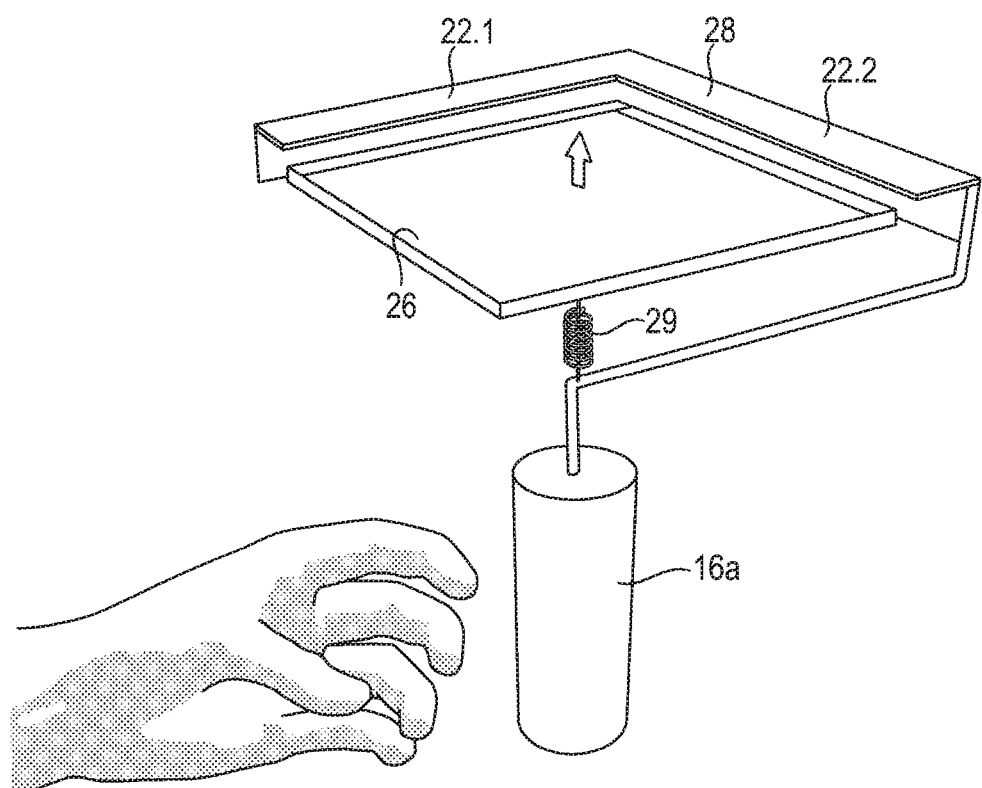

In another variant the adjustable compression plate 26 is supported linearly adjustable in reference to the stop area 30 and in reference to the handle-like grip section 16a, in particular the handle-like grip section 16a is fastened rigidly in reference to the stop area 30, as shown schematically in FIG. 10.

Figure 11:
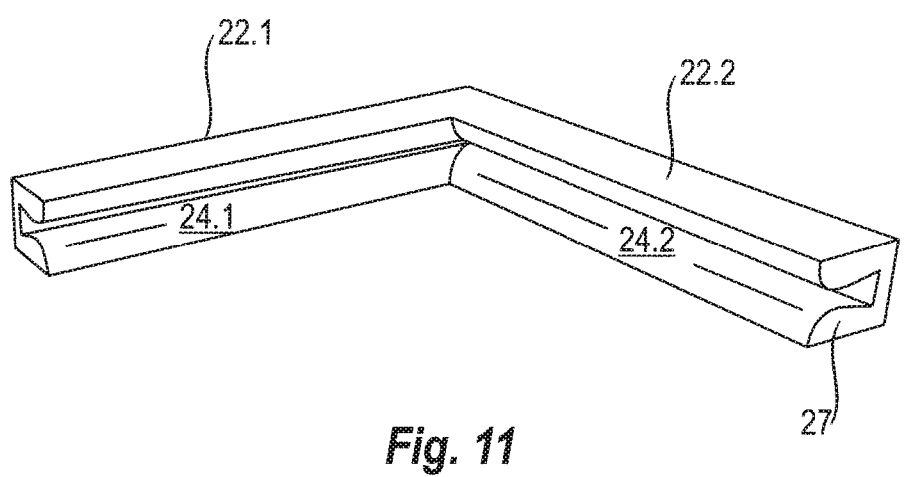

In FIG. 11 it is shown schematically how the first holding arm 22.1 and the second holding arm 22.2, particularly the first groove-like seat 24.1 and the second groove-like seat 24.2, have a clamping profile 27 made from an elastic material.

Figure 12:
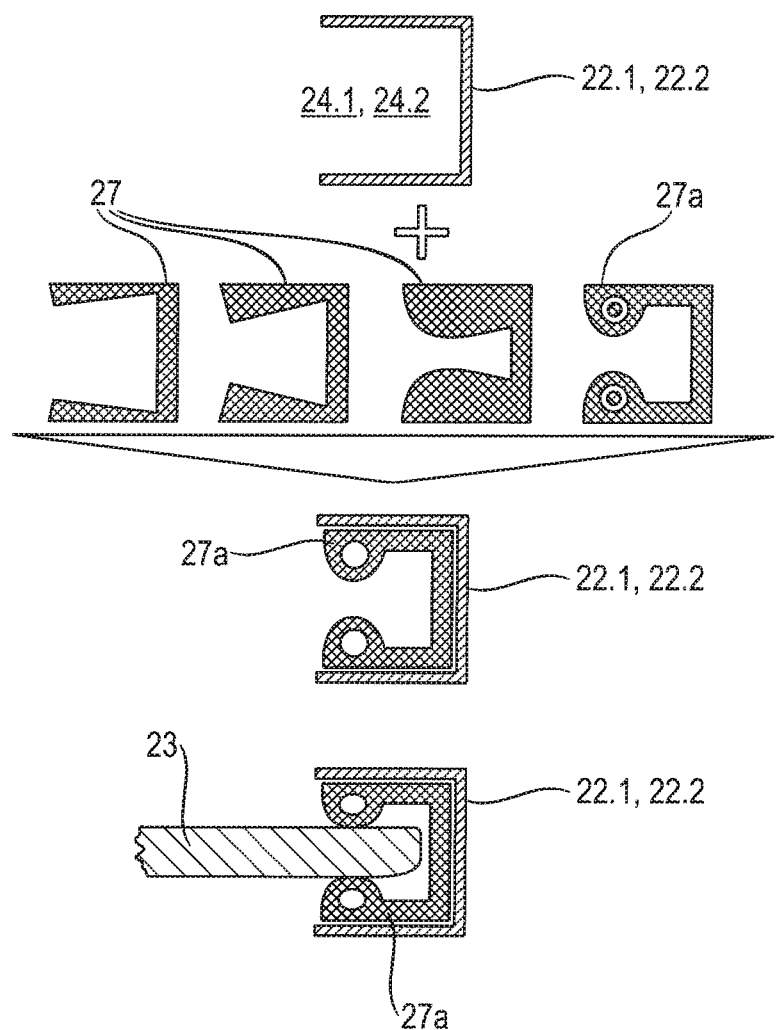

FIG. 12 shows schematically, how differently designed clamping profiles 27 or also a hollow-chamber profile 27a made from an elastic material can be inserted into the first groove-like seat 24.1 and/or the second groove-like seat 24.2 and can also be removed therefrom. For example, different clamping profiles 27 or hollow-chamber profiles 27a can be used depending on the device 23 respectively selected for insertion.

Figure 13:
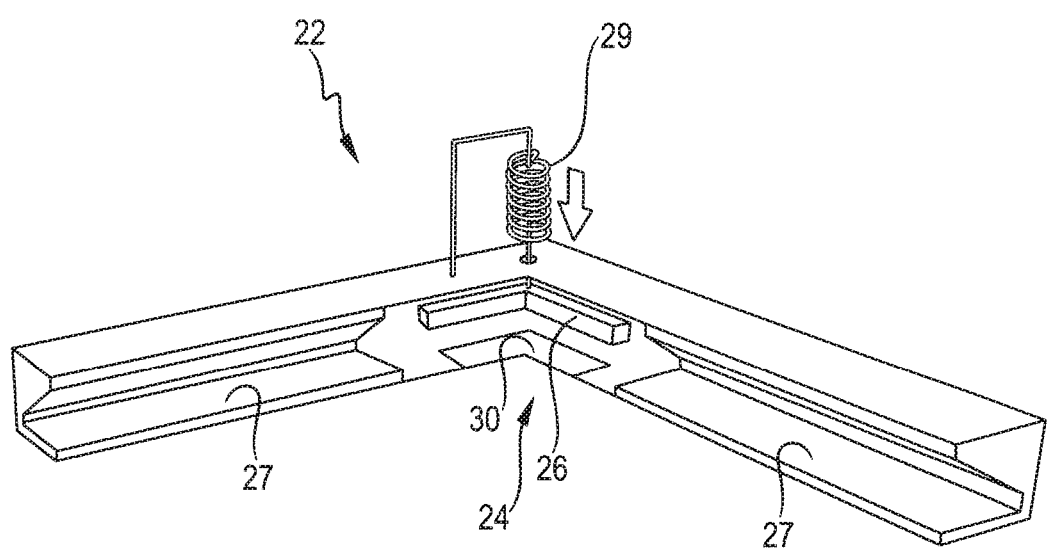

FIG. 13 shows an embodiment variant, in which the clamping profiles 27 are used combined with a compression plate 26 and a stop area 30 in the corner section 24 of the holder 22, in which the compression plate 26 is pre-stressed by a spring 29 into a clamping position.

Figure 14:
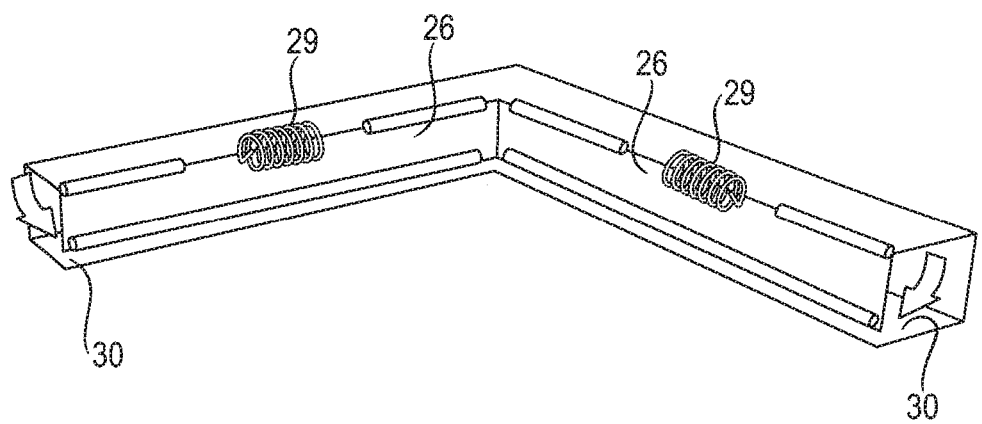

FIG. 14 shows an embodiment variant, in which the compression plate 26 is supported pivotally in reference to the stop area 30. The two springs 29 are designed as torsion springs, and pivot the compression plate 26 against the stop areas 30.

Figure 15:
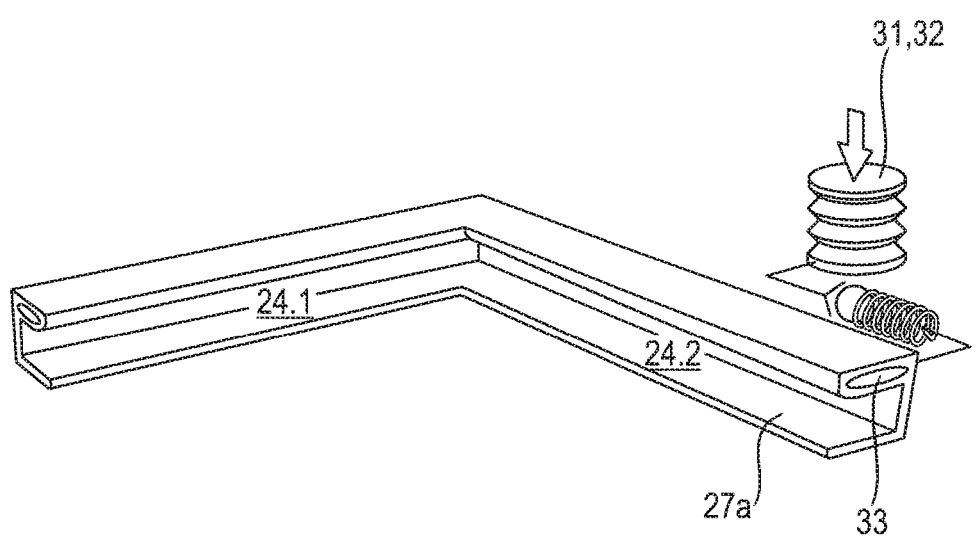

FIG. 15 shows a variant in which a hollow-chamber profile 27a can be expanded via a fluid, particularly compressed air, in order to generate a clamping force.

According to such a variant the handheld robot operation unit 15 may have a fluid reservoir 31 and/or a fluid pump 32. Via the fluid pump 32 the fluid can be pumped into at least one hollow chamber 33 of the hollow chamber profile 27a, so that the hollow chamber profile 27a can enlarge, allowing the first groove-shaped seat 24.1 and/or the second groove-shaped seat 24.2 to constrict.

Figure 16:
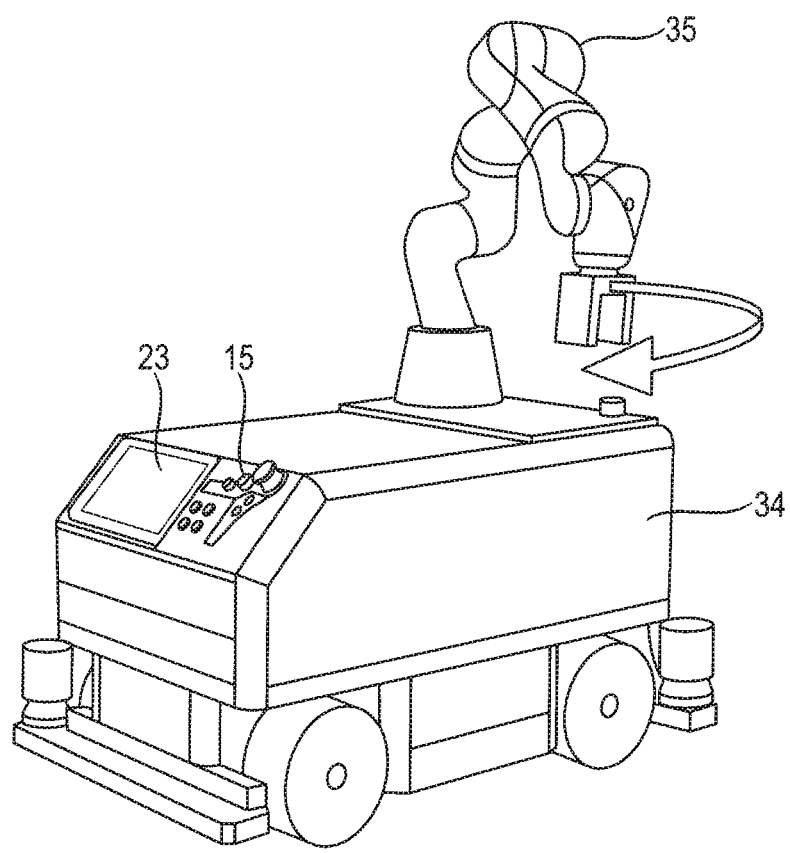

FIG. 16 shows a mobile robot platform 34 on which a robot arm 35 is fastened. Via a holder both a handheld robot operation unit 15 according to the invention, as well as a device 23 can be held at the mobile robot platform 34 in a manually detachable fashion.

Figure 17:
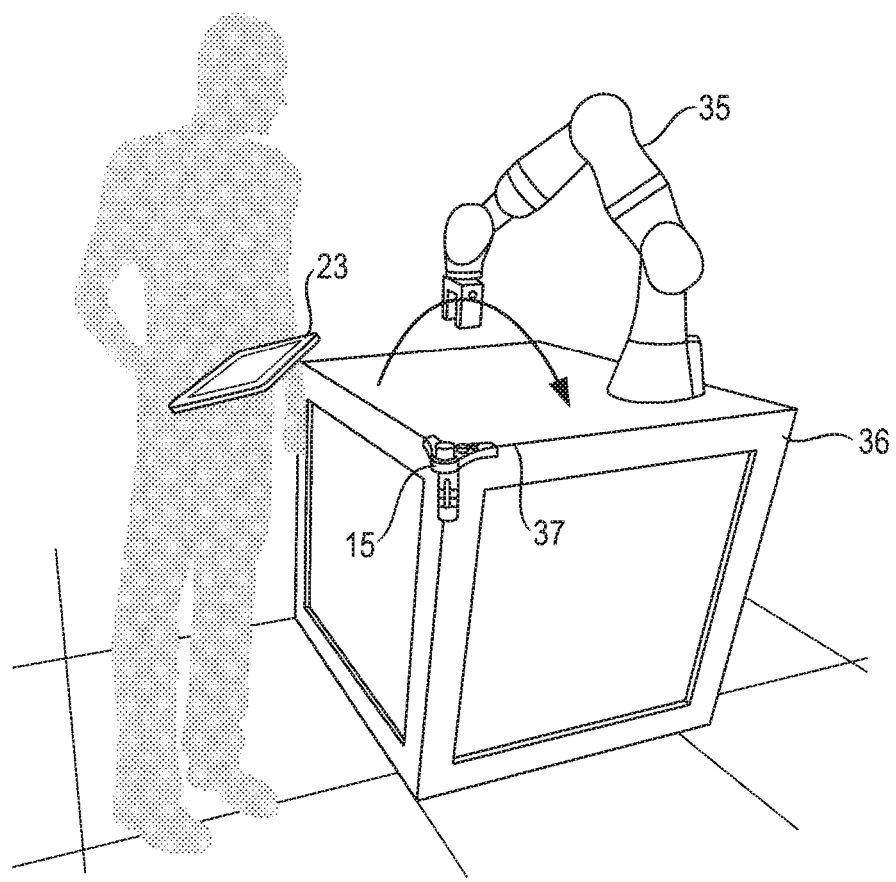

FIG. 17 shows a control base 36 on which a robot arm 35 is fastened. Via a holder a handheld robot operation unit 15 according to the invention can be held at the control base 36 in a manually detachable fashion. For this purpose, the control base 36 may have an edge 37 like the edge of a table, at which the handheld robot operation unit 15 according to the invention can be clamped with its holder 22 according to the invention as described and claimed.

When the handheld robot operation unit 15 according to the invention is removed manually from the control base 36, for example, and held as a separate handheld robot operation unit 15 in the hand of the user, this separately held handheld robot operation unit 15 forms an autonomous 6D-mouse, by which the user can directly and manually guide the robot arm 35 or also the mobile robot platform 34 by moving and/or rotating the hand and/or the wrist. For example, for this purpose the positions and/or alignments of a reference point, particularly TCPs of the robot arm 35 and/or the mobile robot platform 34 can be coupled to the positions and/or alignments of the handheld robot operation unit 15 held manually. A movement of the hand and/or the handheld robot operation unit 15 held manually causes here directly a respective equivalent motion of the robot arm 35 or the mobile robot platform 34.

Figure 18:
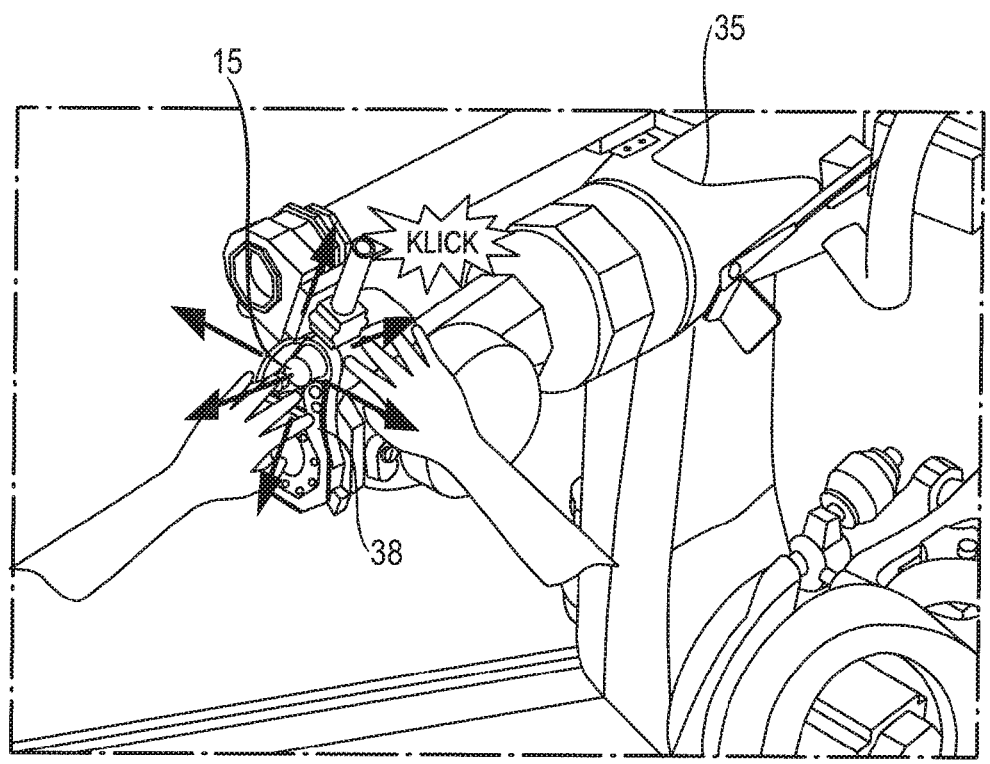

FIG. 18 shows a robot arm 35. Via the holder 22 a handheld robot operation unit 15 according to the invention can for example also be fastened at a flange 38 of the robot arm 35 in a manually detachable fashion. For this purpose, the flange 38 may show an edge, at which the handheld robot operation unit 15 according to the invention can be clamped with its holder 22 according to the invention, as described and claimed. In the clamped arrangement of the handheld robot operation unit 15 at the flange 38 can the robot arm 35 then be guided, for example manually, and its joints can be adjusted by a manual guidance of the handheld robot operation unit 15.

Figure 19:
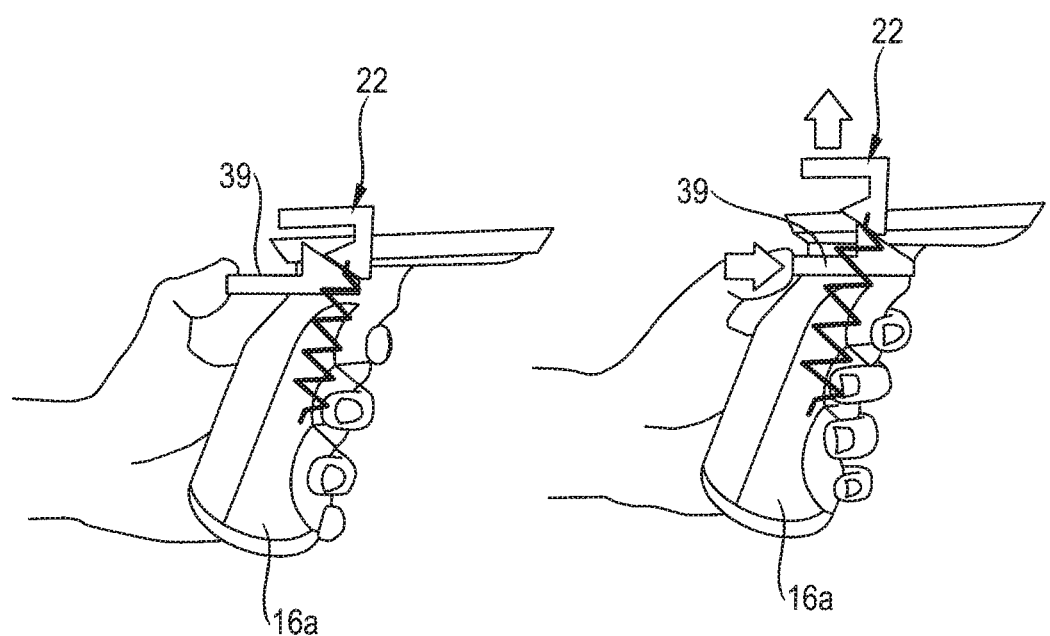
Figure 20:
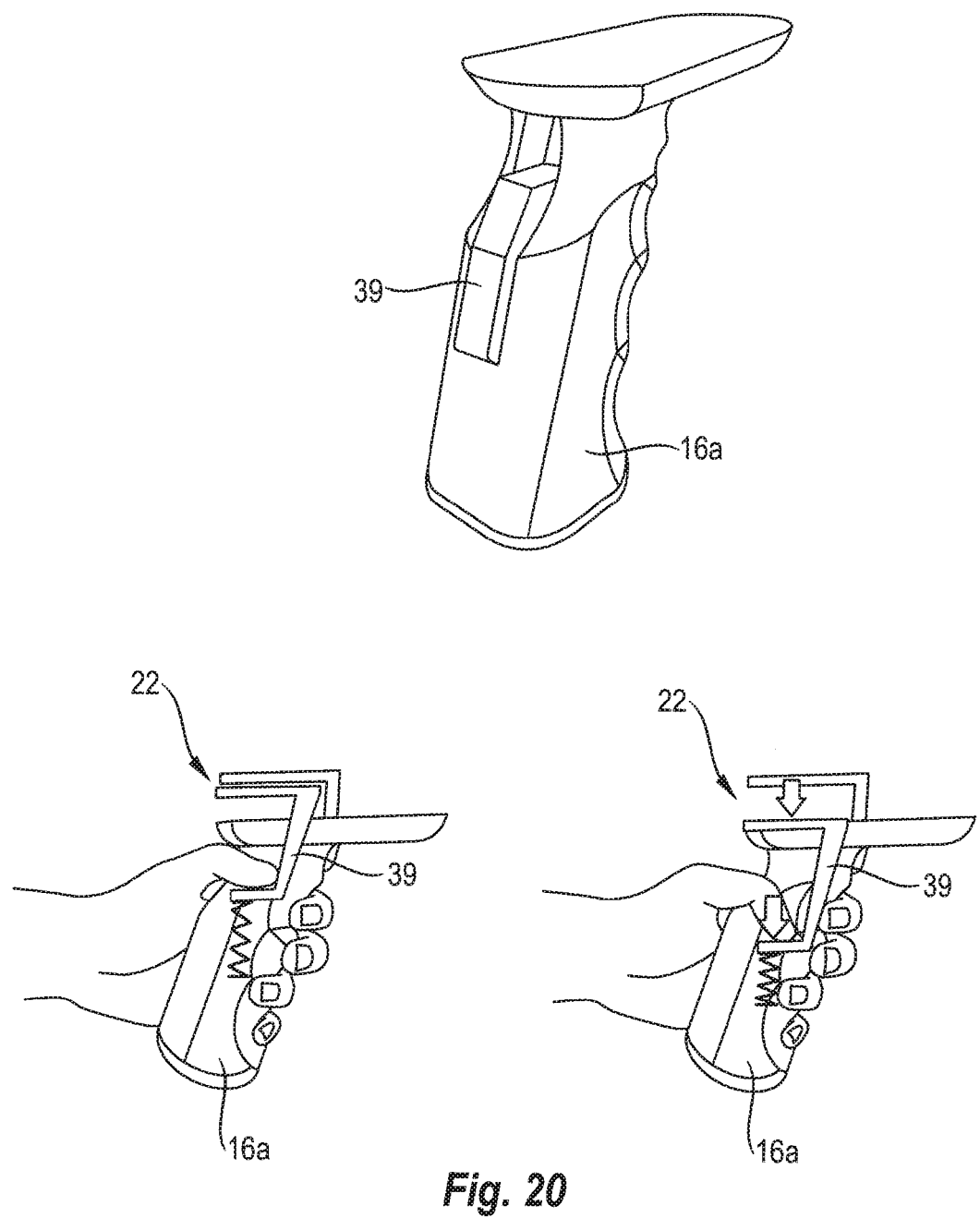

FIG. 19 and FIG. 20 show two variants of handheld robot operation units 15, each respectively with an actuating means 39 arranged at the handle-like grip section 16a, which is designed to hold the holder 22 in a clamped position in a locking stage of the actuating means 39 and in an unlocking stage of the actuating means 39 releasing the holder 22 from its clamped position.

Pairing of the handheld robot operation unit 15 with the device 23 can for example occur by NFC and/or RFID-technologies known per se to one trained in the art by a simple holding together and/or plugging together of the respective partners.

An actuating means and/or a trigger, such as the locking means 39, may particularly be integrated at the handle, however it may for example also rest separately on a corner of the device 23 and thus be arranged intentionally separated from the handle. This way, an intentional triggering is necessary and desired with a hand different from the holding one. Here, the actuating means may serve, in combination with a specially formed environment, also as a handle for the one-handed holding during the coupling process.

By a special design of the second leg 16.2 this may also be grasped. A second enabling key located underneath thereof, for example, can allow forming a second holding variant. The right hand here grasps the leg 16.2, the left hand grasps the left edge of the tablet. This way, the holding position of the device 23 can also be changed arbitrarily, particularly according to ergonomic aspects.

When holding the handheld robot operation unit 15 the top of the hand may rest on the bottom of the central plate. This allows a relaxed holding. When a tablet PC is integrated, it rests with the corner/bottom facing away from the handheld robot operation unit 15 on the lower arm of the user. This allows a relaxed holding with the tablet.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A handheld robot operation unit, comprising:
a housing having a handle-like grip section;
a basic safety control device arranged in the housing; and
at least one holder connected to the housing and configured to manually detachably couple the housing to a device separate from the handheld robot operation unit and which electronically communicates with the basic safety control device;
the holder comprising:
a first holding arm configured to mechanically connect the handheld robot operation unit to a first edge section of the separate device such that an opposite edge section of the separate device remains free, and
a second holding arm configured to mechanically connect the handheld robot operation unit to a second edge section of the separate device that is adjacent the first edge section and forms a corner section of the separate device, such that a third edge section of the separate device opposite the second edge section remains free;
wherein the first holding arm and the second holding arm comprise at least one holding bracket having an L-shaped or U-shaped cross-section, and a compression plate adjustably supported relative to the holding bracket.

2. The handheld robot operation unit of claim 1, wherein:
the first holding arm comprises a first groove-like seat configured to engage around the first edge section of the separate device;
the second holding arm comprises a second groove-like seat configured engage around the second edge section of the device; and
the second groove-like seat is arranged with its longitudinal extension disposed at a right angle relative to the first groove-like seat.

3. The handheld robot operation unit of claim 1, wherein the housing further comprises:
a first housing leg at which the first holding arm is arranged; and
a second housing leg at which the second holding arm is arranged;
the first housing leg and the second housing leg defining a plane of the housing that extends parallel to a primary plane of the separate device when the separate device is received in the housing, and from which the handle-like grip section of the handheld robot operation unit extends downwardly away from the plane of the housing.

4. The handheld robot operation unit of claim 3, wherein the handle-like grip section of the handheld robot operation unit extends perpendicularly away from the plane of the housing.

5. The handheld robot operation unit of claim 1, wherein the at least one holding bracket comprises a first groove-like seat and a second groove-like seat associated with the first and second holding arms, respectively.

6. The handheld robot operation unit of claim 1, wherein the compression plate is biased by a spring force into a default position, and is movable to a seated position for supporting the separate device such that the two edge sections of the separate device that form a corner are seated in at least one of a form-fitting manner or a force-fitting manner when the handheld robot operation unit is attached to the separate device by the first holding arm and the second holding arm.

7. The handheld robot operation unit of claim 6, wherein the two edge sections of the separate device that form a corner are attached by a first groove-like seat and a second groove-like seat associated with the first and second holding arms, respectively.

8. The handheld robot operation unit of claim 1, wherein:
the first holding arm and the second holding arm further comprise an abutment surface configured to contact a front surface of the separate device when the separate device is coupled with the handheld robot operation unit; and
the compression plate contacts a rear surface of the separate device, with the compression plate adjustably supported such that different thicknesses of separate devices are seated in the housing relative to the abutment surface.

9. The handheld robot operation unit of claim 8, wherein the abutment surface comprises a first groove-like seat and a second groove-like seat associated with the first and second holding arms, respectively.

10. The handheld robot operation unit of claim 8, wherein the compression plate is supported in a linearly adjustable fashion relative to the abutment surface.

11. The handheld robot operation unit of claim 10, wherein the adjustable compression plate is supported together with the handle-like grip section in a linearly adjustable manner.

12. The handheld robot operation unit of claim 10, wherein the adjustable compression plate is adjustably supported relative to the abutment surface and the handle-like grip section.

13. The handheld robot operation unit of claim 12, wherein the handle-like grip section is rigidly fixed relative to the abutment surface.

14. The handheld robot operation unit of claim 8, wherein the compression plate is pivotally supported relative to the abutment surface.

15. The handheld robot operation unit of claim 1, wherein the first holding arm and the second holding arm comprise a clamping profile formed from an elastic material.

16. The handheld robot operation unit of claim 15, wherein the first groove-like seat and the second groove-like seat of the first and second holding arms comprise the clamping profile.

17. The handheld robot operation unit of claim 15, wherein the clamping profile comprises a hollow-chamber profile.

18. The handheld robot operation unit of claim 15, wherein the clamping profile is expandable by a fluid to generate a clamping force.

19. The handheld robot operation unit of claim 18, wherein the clamping profile is expandable by compressed air to generate the clamping force.

20. The handheld robot operation unit of claim 1, wherein the basic safety control device (17) comprises at least one of:
an emergency stop trigger;
enabling device;
an operating type selector;
at least a 3D-6D-mouse; or
a display.

21. The handheld robot operation unit of claim 20, wherein the basic safety control device comprises an electronic display.

22. The handheld robot operation unit of claim 1, wherein the holder is configured to manually detachably couple the housing to a separate device which is at least one of a robot arm, a robot control base, a mobile robot platform, or a mobile terminal.

23. The handheld robot operation unit of claim 22, wherein the holder is configured to manually detachably couple the housing to a computer tablet.

24. The handheld robot operation unit of claim 1, further comprising a manual actuator, the manual actuator having a locking position wherein the holder is maintained in a clamped condition against the separate device, and an unlocking position wherein the holder is release from the clamped condition.

25. The handheld robot operation unit of claim 24, wherein the manual actuator is arranged on the handle-like grip section.

* * * * *